United States Patent
Schon et al.

(10) Patent No.: US 8,640,008 B2
(45) Date of Patent: Jan. 28, 2014

(54) ERROR RECOVERY IN A DATA PROCESSING APPARATUS

(75) Inventors: Guillaume Schon, Golfe Juan (FR); Luca Scalabrino, Biot (FR); Frederic Claude Marie Piry, Cagnes-sur-Mer (FR); David Michael Bull, Balsham (GB)

(73) Assignee: ARM Limited, Cambridge (GB)

( * ) Notice: Subject to any disclaimer, the term of this patent is extended or adjusted under 35 U.S.C. 154(b) by 92 days.

(21) Appl. No.: 13/336,428

(22) Filed: Dec. 23, 2011

(65) Prior Publication Data
US 2013/0166980 A1     Jun. 27, 2013

(51) Int. Cl.
 *H03M 13/00*    (2006.01)
(52) U.S. Cl.
 USPC .......................... 714/775; 714/746; 712/228
(58) Field of Classification Search
 USPC .................................. 714/746, 775; 712/228
 See application file for complete search history.

(56) References Cited

U.S. PATENT DOCUMENTS

| | | | |
|---|---|---|---|
| 5,961,636 A | 10/1999 | Brooks et al. |
| 6,212,619 B1 | 4/2001 | Dhong et al. |
| 6,230,262 B1 | 5/2001 | Witt |
| 6,981,261 B2 | 12/2005 | Kalafatis et al. |
| 7,127,592 B2 | 10/2006 | Abraham et al. |
| 7,325,078 B2 | 1/2008 | Walker et al. |

OTHER PUBLICATIONS

Bowman et al., "A 45 nm Resilient Microprocessor Core for Dynamic Variation Tolerance", *IEEE Journal of Solid-State Circuits*, vol. 46, No. 1, Jan. 2011, pp. 194-208.

Tsuchanz et al., "Adaptive Frequency and Biasing Techniques for Tolerance to Dynamic Temperature-Voltage Variations and Aging", *ISSCC 2007*, Session 16, 16.4, 2007, pp. 292-293 & 604.

Blaauw et al., "Razor II: In Situ Error Detection and Correction for PVT and SER Tolerance", *ISSCC 2008*, Session 22, 22.1, 2008, pp. 400-401 & 622.

Bowman et al., "Energy-Efficient and Mestability-Immune Timing-Error Detection and Instruction-Replay Based Recovery Circuits for Dynamic-Variation Tolerance", *ISSCC 2008*, Session 22, 22.2, 2008, pp. 402-403 & 623.

Nicoladis et al., "A Generalized Theory of Fail-Safe Systems", *IEEE*, 1998, pp. 398-406.

Floros et al., "A Pipeline Architecture Incorporating Low-Cost Error Detection and Correction Mechanism", *IEEE*, 2006, pp. 692-695.

Bull et al., Corrections to "A Power-Efficient 32 bit ARM Processor Using Timing-Error Detection and Correction for Transient-Error Tolerance and Adaptation to PVT Variation", *IEEE Journal of Solid-State Circuits*, vol. 46, No. 3, Mar. 2011, p. 705.

(Continued)

*Primary Examiner* — Sam Rizk
(74) *Attorney, Agent, or Firm* — Nixon & Vanderhye P.C.

(57) ABSTRACT

A data processing apparatus has error detection units each configured to generate an error signal if a first and second sample of a signal associated with execution of an instruction differ. Error value generation circuitry generates an error value showing if any of the error detection units have generated the error signal. Error value stabilisation circuitry performs a stabilisation procedure comprising re-sampling the error value to remove metastability. Error recovery circuitry initiates re-execution of the instruction if the error value is asserted. Count circuitry holds a counter value in association with the error value, the counter value set to a predetermined value when the error value is generated and decremented each time the error value is re-sampled prior to reaching the error value stabilisation circuitry. The error value bypasses the stabilisation procedure if the counter value is zero before the error value reaches the error value stabilisation circuitry.

16 Claims, 7 Drawing Sheets

(56) References Cited

OTHER PUBLICATIONS

Lubaszewski et al., "A Reliable Fail-Safe System", *IEEE Transactions on Computers*, vol. 47, No. 2, Feb. 1998, pp. 236-241.

Meixner et al., "Argus: Low-Cost, Comprehensive Error Detection in Simple Cores", *40th IEEE/ACM Int'l. Symposium on Microarchitecture*, 2007, pp. 210-222.

Das et al., "A Self-Tuning DVS Processor Using Delay-Error Detection and Correction", *IEEE Journal of Solid-State Circuits*, vol. 41, No. 4, Apr. 2006, pp. 792-804.

Das et al., "A Self-Tuning DVS Processor Using Delay-Error Detection and Correction", *2005 Symposium on VLSI*, 17.1, 2005, pp. 258-261.

Tsiatouhas et al., "A Sense Amplifier Based Circuit for Concurrent Detection of Soft and Timing Errors in CMOS ICs", *9th IEEE Int'l. Online Testing Symposium*, 2003, 5 pages.

Agarwal et al., "Circuit Failure Prediction and Its Application to Transistor Aging", *25th IEEE VLSI Test Symposium*, 2007, 8 pages.

Anghel et al., "Cost Reduction and Evaluation of a Temporary Faults Detecting Technique", No Date, 8 pages.

Nomura et al., "Delay and Power Monitoring Schemes for Minimizing Power Consumption by Means of Supply and Threshold Voltage Control in Active and Standby Modes", *IEEE Journal of Solid-State Circuits*, vol. 41, No. 4, Apr. 2006, pp. 805-814.

Raahemifar et al., "Design-for-Testability Techniques for Detecting Delay Faults in CMOS/BiCMOS Logic Families", *IEEE Transactions on Circuits and Systems*, vol. 47, No. 11, Nov. 2000, pp. 1279-1290.

M. Nicoladis, "Efficient Implementations of Self-Checking Adders and Alus", *IEEE*, 1993, pp. 586-595.

Nicoladis et al., "Efficient Implementations of Self-Checking Multiply and Divide Arrays", *IEEE*, 1994, pp. 574-579.

Nicoladis et al., "Fault-Secure Parity Prediction Arithmetic Operators", *IEEE Design & Test of Computers*, 1997, pp. 60-71.

Austin et al., "Making Typical Silicon Matter with Razor", *IEEE Computer Society*, Mar. 2004, pp. 57-65.

Yeager et al., "Microprocessor Power Optimization through Multi-Performance Device Insertion", *2004 Symposium on VLSI Circuits*, 20.5, 2004, pp. 334-337.

Franco et al., "On-Line Delay Testing of Digital Circuits", *IEEE*, 1994, pp. 167-173.

Kurimoto et al., "Phase-Adjustable Error Detection Flip-Flops with 2-Stage Hold Driven Optimization and Slack Based Grouping Scheme for Dynamic Voltage Scaling", *DAC 2008*, 47.3, pp. 884-889.

Ernst et al., "Razor: A Low-Power Pipeline Based on Circuit-Level Timing Speculation", *36th Int'l. Symposium on Microarchitecture*, 2003, 12 pages.

Dutt et al., "REMOD: A New Methodology for Designing Fault-Tolerant Arithmetic Circuits", *IEEE Transactions on VLSI*, vol. 5, No. 1, Mar. 1997, pp. 34-56.

Bowman et al., "Resilient Microprocessor Design for Improving Performance and Energy Efficient", *IEEE*, 2010, pp. 85-88.

Mitra et al., "Robust System Design with Built-In Soft-Error Resilience", *IEEE Computer Society*, Feb. 2005, pp. 43-52.

Metra et al., "Self-Checking Detection and Diagnosis of Transient, Delay, and Crosstalk Faults Affecting Bus Lines", *IEEE Transactions on Computers*, vol. 49, No. 6, Jun. 2000, pp. 560-574.

Calhoun et al., "Standby Power Reduction Using Dynamic Voltage Scaling and Canary Flip-Flop Structures", *IEEE Journal of Solid-State Circuits*, vol. 39, No. 9, Sep. 2004, pp. 1504-1511.

M. Nicoladis, "Strongly Fail-Safe Interfaces Based on Concurrent Checking", *IEEE*, 1994, pp. 45-50.

H. Veendrick, "The Behavior of Flip-Flops Used as Synchronizers and Prediction of Their Failure Rate", *IEEE Journal of Solid-State Circuits*, vol. SC-15, No. 2, Apr. 1980, pp. 169-176.

M. Nicoladis, "Time Redundancy Based Soft-Error Tolerance to Rescue Nanometer Technologies", *TIMA*, No Date, 9 pages.

Karimi et al., "Workload-Cognizant Concurrent Error Detection in the Scheduler of a Modern Microprocessor", *IEEE Transactions on Computers*, vol. 60, No. 9, Sep. 2011, pp. 1274-1287.

Moudgil et al., "Register renaming and dynamic speculation: an alternative approach", Sep. 1993, pp. 1-13.

Copeland et al., "The GNU Privacy Handbook", *The Free Software Foundation*, 1999, 41 pages.

ERROR RECOVERY IN A DATA PROCESSING APPARATUS

BACKGROUND OF THE INVENTION

1. Field of the Invention

The present invention relates to a data processing apparatus configured to detect the occurrence of an error during execution of data processing instructions. More particularly, the invention relates to a data processing apparatus having an error recovery unit configured to initiate re-execution of an instruction if an error is detected in association with the execution of that instruction.

2. Description of the Prior Art

It is known to provide a data processing apparatus with at least one error detection unit which is configured to take two samples of a given signal propagating in the data processing apparatus, the second sample being taken after a short delay period (but within the same clock cycle) with respect to the first sample, and to generate an error signal if the two samples differ. Such an error detection unit is for example of benefit in a data processing apparatus in which it may be attempted to operate at, or at least close to, its limits of reliable operation, for example in terms of clock speed, operating voltage, or even process reliability. An error signal generated by the error detection unit can indicate that the data processing apparatus has entered a regime in which the first sample of the signal has become unreliable (as determined with reference to the second sample), for example because a changing signal has been sampled slightly too early and therefore in a wrong state.

In a data processing apparatus which has an error detection unit it is further known to provide an error recovery unit which seeks to initiate an error recovery procedure which is carried out to seek to remedy adverse consequences resulting from that error. For example, in conjunction with an exception storage unit in the data processing apparatus, if the error detected is associated with a particular instruction, that instruction and any that follow it in the exception storage unit may be replayed in order to ensure that correct data processing operations in response to the data processing instructions are carried out.

The provision of an error detection unit enables the data processing apparatus to be operated in a regime where errors may occur, because a mechanism is provided for coping with such errors. Further, when the first and second samples of a signal taken by the error detection unit differ, it may be the case that the first sample was effectively taken too early, in particular before the error detection unit was stably configured to perform that first sampling. As a result some metastability of the error signal generated by the error detection unit can occur, the conventional solution to which is to provide stabilisation circuitry which re-samples the error signal a number of times (typically twice) in order that a reliable, stable error signal is produced.

Any circuitry in the data processing apparatus which is configured to respond to the error signal, for example error recovery circuitry, must therefore wait until the stabilisation circuitry has stabilised the error signal before it can be reliably acted upon. This delay (for example of two clock cycles) is a disadvantage when seeking to improve the operating speed of the data processing apparatus and accordingly it would be desirable to provide a data processing apparatus which could, at least in some instances, avoid such delays.

SUMMARY OF THE INVENTION

Viewed from a first aspect, the present invention provides a data processing apparatus configured to perform data processing operations in response to a sequence of instructions, said data processing apparatus comprising: a plurality of error detection units, each error detection unit configured to generate a first sample of a signal associated with execution of an instruction, configured to generate a second sample of said signal after a delay period, and configured to generate an error signal if said first sample and said second sample differ; error value generation circuitry configured to generate an error value indicative of whether any of said plurality of error detection units have generated said error signal; error value stabilisation circuitry configured to receive said error value and to perform a stabilisation procedure on said error value, said stabilisation procedure comprising re-sampling said error value to remove metastability from said error value resulting from metastability of said error signal generated by at least one of said error detection units; error recovery circuitry configured to receive said error value from said error value stabilisation circuitry and to initiate re-execution of said instruction if said error value indicates that said error signal was generated by at least one of said error detection units; count circuitry configured to hold a counter value in association with said error value, said counter value being set to a predetermined value when said error value is generated, and said count circuitry configured to decrement said counter value each time said error value is re-sampled prior to reaching said error value stabilisation circuitry; and bypass circuitry configured to pass said error value to said error recovery circuitry directly without being subjected to said stabilisation procedure if said counter value is zero before said error value reaches said error value stabilisation circuitry.

A data processing apparatus is provided which performs data processing operations in response to a sequence of instructions and has a plurality of error detection units which each generate a first sample of a signal associated with execution of an instruction, a second sample of the same signal after a delay period and generate an error signal if the first sample and second sample differ. The delay period causes the second sample to be taken within the same clock cycle as the first sample, so that in principle the first and second samples should be the same. However, the provision of such error detection units enables the data processing apparatus to be operated in a regime which would otherwise be deemed too unreliable because of the chance of errors occurring. For example, the regime could comprise operating the data processing apparatus at a high clock speed or at a low operating voltage, or could even relate to the physical construction of the data processing apparatus in that the data processing apparatus is fabricated according to constructional parameters which mean that the operation of the data processing apparatus is not guaranteed to be reliable (i.e. due to process variation). Hence, when the operation of the data processing apparatus results in the first and second sample being different from one another, it is recognised that the first sample of this signal cannot be relied on for data processing operations and an error signal is generated. Error value generation circuitry generates an error value indicative of whether any of the error detection units have generated the error signal and accordingly the error value can be treated as a "master" value on the basis of which a decision as to whether to take corrective action can be made.

Because of the nature of the sampling of the signal in the error detection units, some metastability of the generated error signals (and hence metastability of the error value) can result. Unmodified this metastability would mean that the error value could not be reliably used and hence error value stabilisation circuitry is provided which removes this metastability by re-sampling the error value. Error recovery circuitry receives the thus-stabilised error value and can initiate re-execution of the relevant instruction if the error value indicates that an error signal was generated by at least one of the error detection units.

The inventors of the present invention realised that the stabilisation procedure carried out on the error value by the error value stabilisation circuitry may not always be necessary and accordingly the delay associated therewith could be avoided. In particular, the stabilisation procedure may be avoided if the construction of the data processing apparatus is such that the error value generated by the error value generation circuitry is re-sampled prior to reaching the error value stabilisation circuitry. In order to reliably determine if the stabilisation procedure can be avoided, the present invention provides count circuitry which holds a counter value in association with the error value, the counter value being decremented every time the error value is re-sampling prior to reaching the error value stabilisation circuitry. The counter value is initially set to a predetermined value (e.g. 2) which will ensure that sufficient resampling of the error value has occurred to allow the stabilisation procedure to be avoided if the counter value reaches zero. Bypass circuitry is provided to allow the error value to bypass the error value stabilisation circuitry (and be passed directly to the error recovery circuitry), if the counter value is zero. Accordingly, it has been recognised that the delay associated with the stabilisation procedure carried out by the error value stabilisation circuitry may be avoided if sufficient resampling of the error value occurs before the error value reaches the error value stabilisation circuitry and the count circuitry and bypass circuitry provide the mechanisms to reliably administer this.

The error value generated by the error value generation circuitry could be found in a variety of locations in a data processing apparatus, but in one embodiment said error value generation circuitry is configured to write said error value into a selected entry of a sequential buffering device having multiple entries, wherein an output of a last entry of said multiple entries of said sequential buffering device provides said error value to an input of said error value stabilisation circuitry, wherein said sequential buffering device is configured to enact sequential movement of content between its multiple entries, wherein said movement of content comprises re-sampling said content, and wherein said count circuitry is configured to propagate said counter value through said sequential buffering device in association with said error value.

A sequential buffering device which moves content between its multiple entries represents an embodiment to which the techniques of the present invention are particularly applicable when the movement of content between those multiple entries comprises resampling that content. Accordingly, if the error value is written into a selected entry of such a sequential buffering device and that error value moves through several entries before being output from a last entry of the sequential buffering device to be passed to the error value stabilisation circuitry, if the number of movements between multiple entries of the sequential buffering device is sufficient then resampling of the error value in the stabilisation procedure is unnecessary. Further, by propagating the counter value through the sequential buffering device in association with the error value, the status of the error value (as regards resampling) can be monitored.

In one such embodiment, said count circuitry is configured to hold said counter value in association with said error value only for a last two entries of said multiple entries. In an example in which the resampling of the stabilisation procedure comprises resampling the error value twice, then movement of the error value through two entries of the sequential buffering device will be sufficient to avoid the stabilisation procedure and accordingly storage provision within the sequential buffering device can be saved by only providing the count circuitry in respect of the last two entries.

The sequential buffering device may take a variety of forms, but in one embodiment said sequential buffering device is a FIFO device.

The sequential buffering device may take a number of forms, but in one embodiment said sequential buffering device is a branch monitor device, and said branch monitor device is configured to hold branch prediction information associated with branch instructions in said sequence of instructions. A branch monitor device represents a component in the data processing apparatus which may particularly benefit from the techniques of the present invention due to the fact that an error associated with branch prediction information can have significant consequence for the data processing operations carried out by the data processing apparatus and accordingly it is beneficial to recognise an error associated with such branch prediction information as soon as possible.

In one embodiment said branch monitor device is configured to enact said sequential movement of said content between its multiple entries when an oldest entry in said branch monitor device relates to a resolved branch instruction. Accordingly, when a branch instruction is resolved, the remainder of the entries in the branch monitor can be sequentially moved between the multiple entries of the branch monitor device, providing the resampling which may enable the subsequent stabilisation procedure to be avoided.

In some embodiments said data processing apparatus is configured to be able to stall progress of said error value at a predetermined location between said error value generation circuitry and said error value stabilisation circuitry, and wherein said data processing apparatus further comprises feedback circuitry configured to feed said error value back upon itself at said predetermined location such that said error value is re-sampled.

The predetermined location could take a variety of forms, for example being a pipeline execution stage where an instruction may stall and an error value propagating in association with the instruction may also stall, or for example in the above-mentioned branch monitor device wherein the branch monitor device is waiting for resolution of a branch, and so on. Recognising that such a stall may take place, the invention further provides feedback circuitry configured to feed the error value back on itself at this predetermined location such that the error value is re-sampled whilst the stall is holding up further propagation of the error value. Accordingly, whilst the error value is held at this predetermined location the required re-sampling may take place.

In some embodiments said data processing apparatus is configured to hold said error value at a predetermined location between said error value generation circuitry and said error value stabilisation circuitry, and wherein said data processing apparatus further comprises feedback circuitry configured to feed said error value back upon itself at said predetermined location such that said error value is re-sampled. Similarly to the above-mentioned stalling example, the present techniques can take advantage of the fact that the error value is being held at a predetermined location and feedback circuitry can be provided to allow the re-sampling to take place whilst the error value is held at that location.

In one embodiment said error value generation circuitry is arranged in a write-back stage of an execution pipeline of said data processing apparatus. The write-back stage typically forms the last of the sequence of pipelined stages in an execution pipeline and accordingly represents the last point at which an error may be generated in association with the execution of a given instruction. Accordingly the techniques of the present invention are particularly applicable when the error value generation circuitry is provided at this stage.

It will be recognised that the stabilisation procedure could comprise different numbers of re-samplings, the more times the error value is re-sampled the more reliable it is deemed to be, but in one embodiment said stabilisation procedure comprises twice re-sampling said error value and wherein said predetermined value is two.

In embodiments in which the stabilisation procedure twice re-samples the error value, the present invention further recognises that even if the whole stabilisation procedure cannot be bypassed it may be possible to partially bypass it and in some embodiments said bypass circuitry is configured, if said counter value is one when said error value reaches said error value stabilisation circuitry, to cause said error value stabilisation circuitry to perform a reduced stabilisation procedure on said error value, said reduced stabilisation procedure comprising once re-sampling said error value. Hence it is recognised that only one further re-sampling of the error value is required and at least a partial reduction in the delay associated with performing the stabilisation procedure may be realised.

It is further recognised that if the bypass circuitry causes the error value to bypass the stabilisation procedure, this could conflict with the propagation of an earlier error value which is currently being handled by the error value stabilisation circuitry and accordingly in some embodiments said bypass circuitry further comprises arbitration circuitry configured to arbitrate between an earlier error value which is currently being handled by said error value stabilisation circuitry and said error value to be passed to said error recovery circuitry directly. Accordingly, depending on the relative priority of the earlier error value and current error value, the arbitration circuitry can prioritise one over the other.

This prioritisation will depend on the particular configuration under consideration and in some embodiments said arbitration circuitry is configured to prioritise the error value whilst in other embodiments said arbitration circuitry is configured to prioritise the earlier error value.

Viewed from a second aspect the present invention provides a data processing apparatus configured to perform data processing operations in response to a sequence of instructions, said data processing apparatus comprising: a plurality of error detection means, each error detection means for generating a first sample of a signal associated with execution of an instruction, for generating a second sample of said signal after a delay period, and for generating an error signal if said first sample and said second sample differ; error value generation means for generating an error value indicative of whether any of said plurality of error detection means have generated said error signal; error value stabilisation means for receiving said error value and for performing a stabilisation procedure on said error value, said stabilisation procedure comprising re-sampling said error value to remove metastability from said error value resulting from metastability of said error signal generated by at least one of said error detection means; error recovery means for receiving said error value from said error value stabilisation means and for initiating re-execution of said instruction if said error value indicates that said error signal was generated by at least one of said error detection means; counting means for holding a counter value in association with said error value, said counter value being set to a predetermined value when said error value is generated, and said counting means for decrementing said counter value each time said error value is re-sampled prior to reaching said error value stabilisation means; and bypass means for passing said error value to said error recovery means directly without being subjected to said stabilisation procedure if said counter value is zero before said error value reaches said error value stabilisation means.

Viewed from a third aspect the present invention provides a method of operating a data processing apparatus configured to perform data processing operations in response to a sequence of instructions, said method comprising the steps of: in each of a plurality of error detection units generating a first sample of a signal associated with execution of an instruction, generating a second sample of said signal after a delay period, and generating an error signal if said first sample and said second sample differ; generating an error value indicative of whether any of said plurality of error detection units have generated said error signal; receiving said error value in error value stabilisation circuitry and to performing a stabilisation procedure on said error value, said stabilisation procedure comprising re-sampling said error value to remove metastability from said error value resulting from metastability of said error signal generated by at least one of said error detection units; receiving said error value from said error value stabilisation circuitry in error recovery circuitry and initiating re-execution of said instruction if said error value indicates that said error signal was generated by at least one of said error detection units; holding a counter value in association with said error value, said counter value being set to a predetermined value when said error value is generated, and decrementing said counter value each time said error value is re-sampled prior to reaching said error value stabilisation circuitry; and passing said error value to said error recovery circuitry directly without being subjected to said stabilisation procedure if said counter value is zero before said error value reaches said error value stabilisation circuitry.

BRIEF DESCRIPTION OF THE DRAWINGS

The present invention will be described further, by way of example only, with reference to embodiments thereof as illustrated in the accompanying drawings, in which.

DESCRIPTION OF THE PREFERRED EMBODIMENTS

Figure 1A:
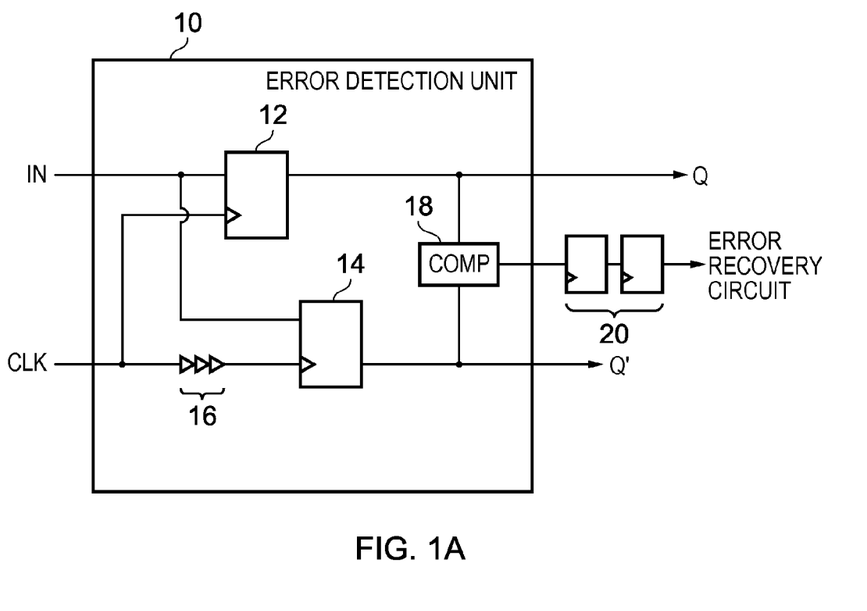
FIG. 1A schematically illustrates an error detection unit in one embodiment.

FIG. 1A schematically illustrates an error detection unit in one embodiment. The error detection unit 10 is arranged to receive two inputs "IN" and "CLK". The IN input provides a signal for which the error detection unit 10 is arranged to detect an error and CLK provides a clock signal which determines when the signal provided at the IN input should be sampled. A first sampling of the IN signal is carried out by digital flip flop (DFF) 12 in dependence on the clock signal (CLK), for example shortly after a rising edge of the CLK signal. A second sampling of the signal IN is carried out by DFF 14 in dependence on a delayed version of the CLK clock signal, this delay being provided by a delay unit 16, which in this example is provided by a sequence of buffers. The delay provided by the delay unit 16 is arranged such that when the signal IN is reliable, both the first sample of the signal taken by DFF 12 and the second sample of the signal taken by DFF 14 should result in the same value. For example, DFF 12 is arranged to sample the IN signal shortly after a rising clock edge of the CLK signal, whilst the DFF 14 is arranged to sample the IN signal shortly after a rising edge of the delayed version of the CLK signal, but still within a time frame such that both samples should be the same, i.e. within the same clock cycle. The comparison of the two samples is carried out by comparator 18, wherein if the two samples (Q and Q') differ then an error signal is generated.

Additionally, because the possibility exists that the undelayed sampling (by DFF 12) took place so early in the clock cycle that DFF 12 was not stably configured when the sample was taken, some metastability of the output signal of comparator 18 can result. Accordingly, the error signal output by the comparator is passed to error value stabilisation circuitry 20 to clean this metastability. In this embodiment the error value stabilisation circuitry is provided by two further flops. The output of the error value stabilisation circuitry 20 is deemed to be reliable (i.e. stable), such that it can be passed to the error value recovery circuit (discussed in more detail below) and acted upon.

Figure 1B:
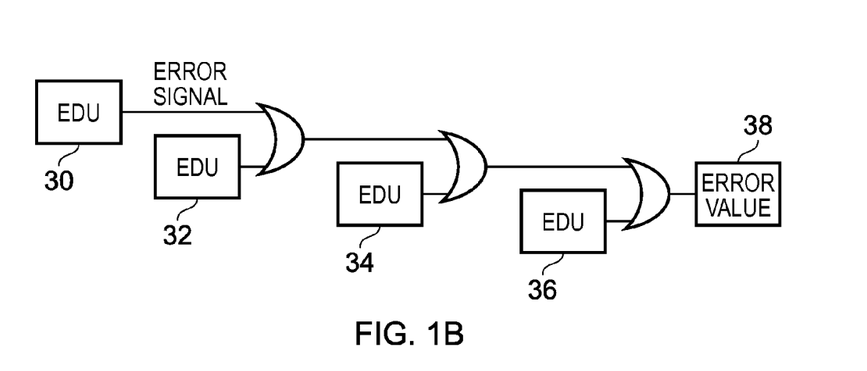
FIG. 1B schematically illustrates the concatenation of a plurality of error detection units via error value generation circuitry which generates an error value in one embodiment.

The error detection unit 10 may be introduced at any point within a data processing apparatus at which the reliability of a signal should be checked. Accordingly, the signal IN in FIG. 1A could either be a data signal or a control signal, and the present techniques can be applied to either situation. Further, many such error detection units are provided in the data processing apparatus. The present invention is particularly concerned with combining together error signals generated by a number of separate error detection units to generate a single error value which is associated with the execution of a particular instruction in the data processing apparatus. The error detection units can therefore be coupled together by error value generation circuitry as schematically illustrated in FIG. 1B in order to generate a final error value which indicates if any of the error detection units 30, 32, 34, 36 have generated an error signal. Importantly, the error value 38 generated represents the value on which (subject to further re-sampling) the decision is taken as to whether an instruction needs re-executing or not. Further specific examples of the generation of an error value 38 will be given with reference to the later figures.

Figure 2:
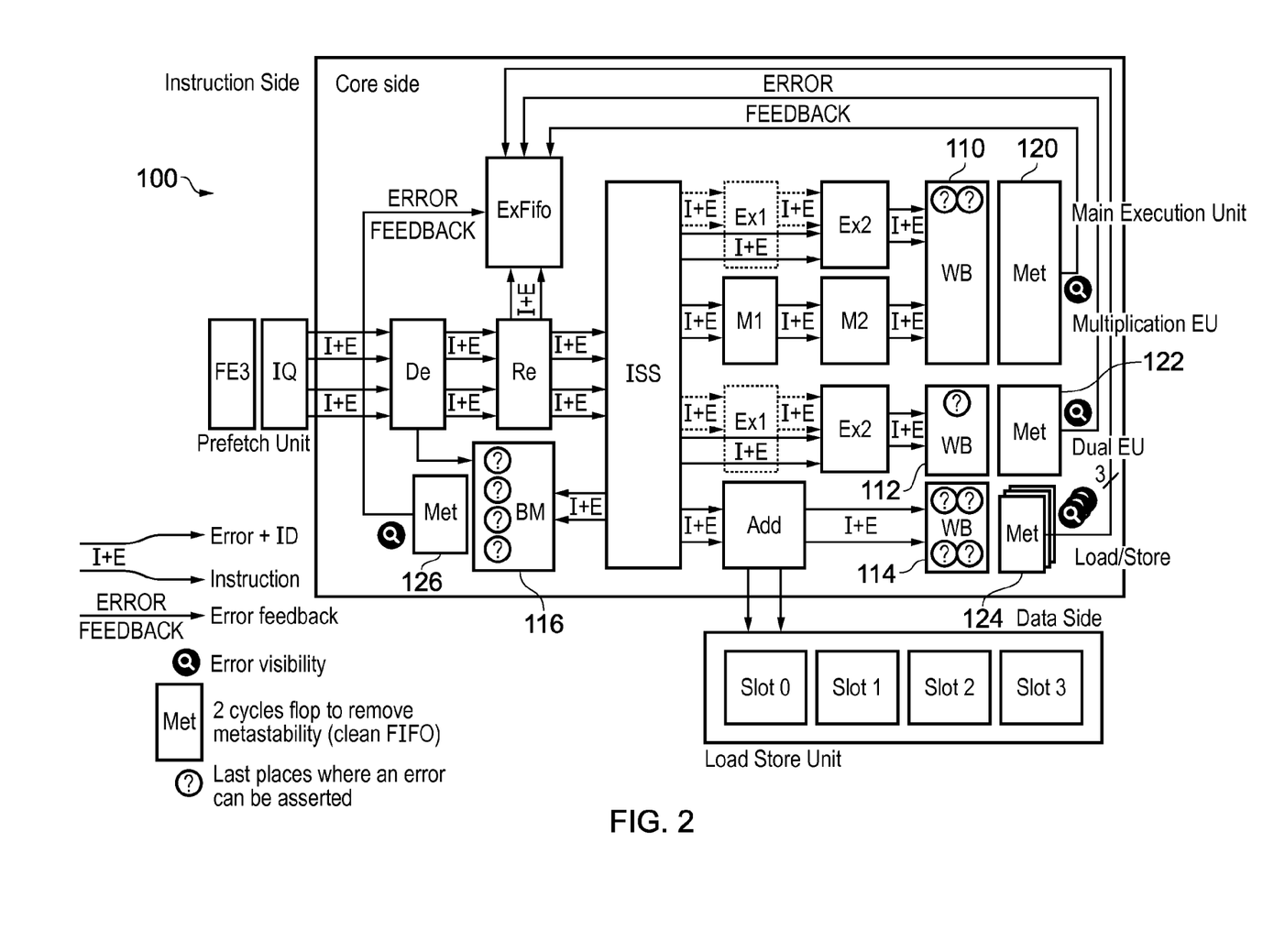
FIG. 2 schematically illustrates a data processing apparatus in one embodiment.

FIG. 2 schematically illustrates a data processing apparatus 100 in which the present techniques are implemented. It will be recognised that data processing apparatus 100 is a pipelined execution device having multiple pipelines. Full detail of the individual components of FIG. 2 is not provided here, as these will be familiar to the skilled person, however in general the path taken by an instruction is from the prefetch unit (FE3/IQ) to the decode unit (De), to the renaming unit (Re), and then to the issue stage (ISS). From the issue stage, the instruction is allocated to one of the execution pipelines which it then follows until the final write back (WB) stage. The illustrated pipelines comprise a Main Execution Unit, a Multiplication Execution Unit, a Dual Execution Unit and a Load/Store Execution unit.

Data processing apparatus 100 also comprises a branch monitor (BM) which is used to track the resolution of branch instructions, i.e. an entry is made in the branch monitor when a branch instruction is encountered by the issue stage and held there until the target PC of that branch instruction is resolved. The data processing apparatus 100 also comprises an exception FIFO (ExFifo) which is used to track the sequence of instructions executing in the execution pipelines such that if an exception occurs which requires a number of instructions to be re-executed (for example because a speculative branch was mis-predicted or because an error occurred during execution of a particular instruction) this can be done with reference to the information held in the ExFifo.

In particular it should be noted that error detection units (as described above with reference to FIG. 1A) are provided throughout the data processing apparatus and as an instruction propagates through the data processing apparatus it is accompanied by an error status item which indicates whether an error has occurred in association with the execution of that instruction.

The propagation of an instruction and its associated error status item is illustrated in FIG. 2 by the pairs of arrows labelled "I+E". For the purposes of the present discussion, particular focus on the write-back stages 110, 112, 114 is made since these stages represent (as indicated by the encircled question mark) the last places where an error can be asserted in association with a given instruction passing through the execution pipelines. Similarly the branch monitor (BM) 116 represents another location where it is the last place where an error can be asserted. In effect, write-back stages 110, 112, 114 and branch monitor 116 can be consider to contain the location equivalent to the box labelled error value 38 schematically illustrated in FIG. 1B. In other words, these are the locations at which error signals generated by multiple error detection units are brought together to generate a single error value which will subsequently be fed back (labelled "error feedback") to initiate appropriate recovery if an error has occurred. However, the error values at these locations are not passed directly back to the error recovery circuitry (schematically illustrated in FIG. 2 by the ExFifo, but described in more detail in the following with reference to FIG. 3), but are passed via respective error value stabilisation circuitry ("Met") 120, 122, 124, 126. These units are provided to remove any metastability from the error values such that they can be reliably acted upon, as was discussed above with reference to FIG. 1A.

Figure 3:
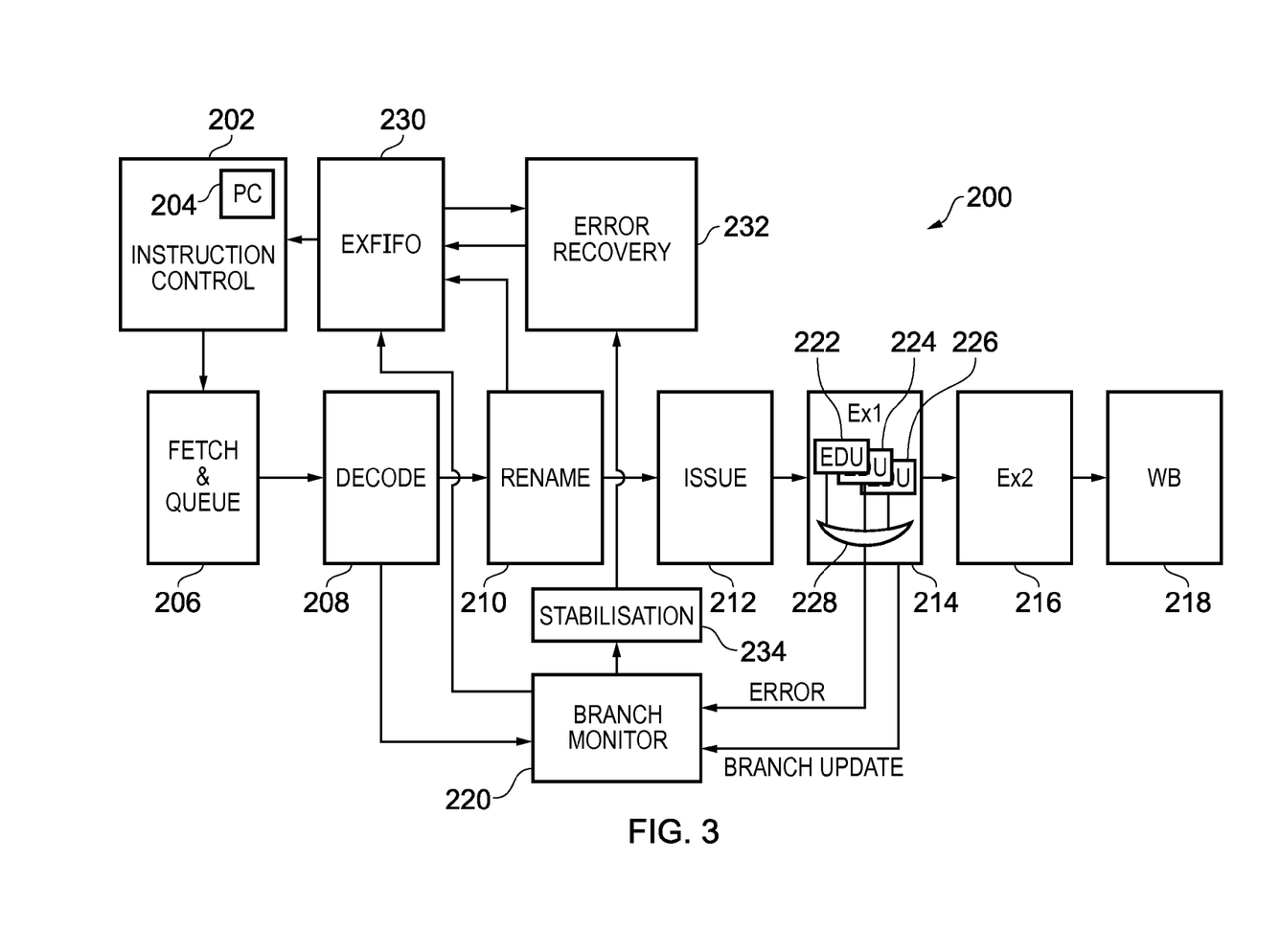
FIG. 3 schematically illustrates data processing apparatus in one embodiment.

FIG. 3 schematically illustrates the configuration of a data processing apparatus similar to that discussed with reference to FIG. 2, in which the generation of an error value passed to the branch monitor and then to the error recovery circuitry is focused upon. Generally the data processing apparatus 200 comprises an instruction control unit 202 which is configured to control the operation of the fetch and instruction queue unit 206 with reference to a program counter (PC) value 204. From the fetch and queue unit 206 the sequence of units are as described above with reference to FIG. 2 namely decode unit 208, rename unit 210, issue unit 212, execution unit EX1 214, execution unit EX2 216 and finally write-back stage 218. Only a single execution pipeline is illustrated here for clarity. Also illustrated is branch monitor 220 which is configured to maintain a set of entries corresponding to branch instructions encountered by the data processing apparatus 200 and which are speculatively executed such that the correct target of those branch instructions is only known after execution of the branch instruction has already been started. FIG. 3 schematically illustrates an example where a branch update for a particular entry in the branch monitor 220 is generated in execution stage EX1 214. In association with this update an error value is also generated indicative of whether any of the error detection units associated with the generation of this branch update within this execution stage have signalled an error. The error detection units are schematically illustrated as 222, 224 and 226 in FIG. 3, the results of which provide the inputs to OR gate 228. It should be appreciated that in practice there may well be many more error detection units involved in this procedure but for simplicity of illustration only three are illustrated here.

When the entry corresponding to this branch instruction becomes the oldest resolved entry in the branch monitor (having passed through its FIFO structure as will be described in more detail with reference to the following figures) the entry is used to update the ExFifo 230, whilst the error value is passed to error recovery unit 232 via stabilisation unit 234. The stabilisation unit 234 is provided to remove any metastability from the error value (as discussed above).

Figure 4:
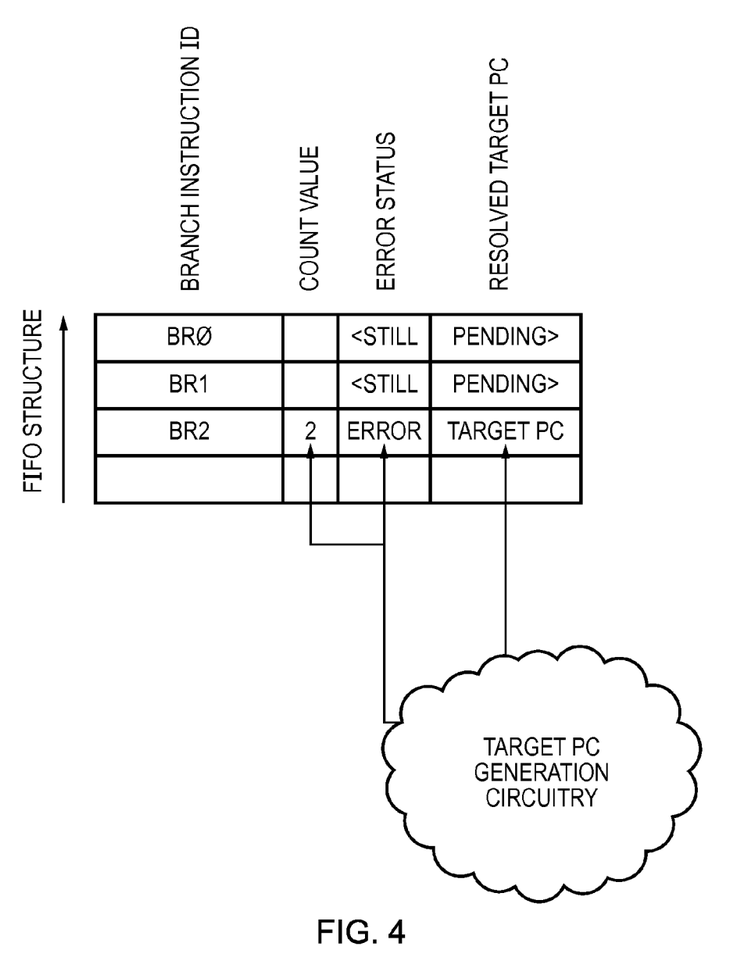
FIG. 4 illustrates example entries in a branch monitor in one embodiment.

More detail of the content of branch monitor 220 in FIG. 3 is represented in FIG. 4. The structure of the branch monitor contains four entries held in FIFO order, wherein branch instructions are held behind older branch instructions in the "queue". Each entry can comprise an indication of the particular branch instruction, an associated count value, an error status item and the resolved target PC for the corresponding branch instruction. Separately (i.e. not part of the branch monitor) target PC generation circuitry is configured to update an entry in the branch monitor with the corresponding target PC, once this is known. As part of writing this target PC value into the corresponding branch monitor entry, the target PC generation circuitry also writes an error value into the error status entry of the branch monitor. The branch monitor is configured such that when an error value is written into one of its entries a corresponding count value of "2" is written into the count value entry associated with the entry. In the illustrated example branch instructions BR0 and BR1 are still pending within the execution pipelines (i.e. their target PCs are not yet known) when the target PC generation circuitry updates the branch instruction BR2 with its target PC value, the corresponding error value and a count value of 2. Once BR0 is resolved, this entry will be retired from the branch monitor, causing the BR1 and BR2 entries to each propagate up one entry in the illustrated FIFO structure. This process of popping BR0 out of the branch monitor and shuffling the BR1 and BR2 entries by one position causes the error value written in association with the BR2 target to PC to be re-sampled, whilst its corresponding count value is decremented (i.e. to 1). Further detail of the evolution of the count value in association with the movement of the error value through the branch monitor FIFO structure is now discussed in more detail with the reference to FIG. 5.

Figure 5:
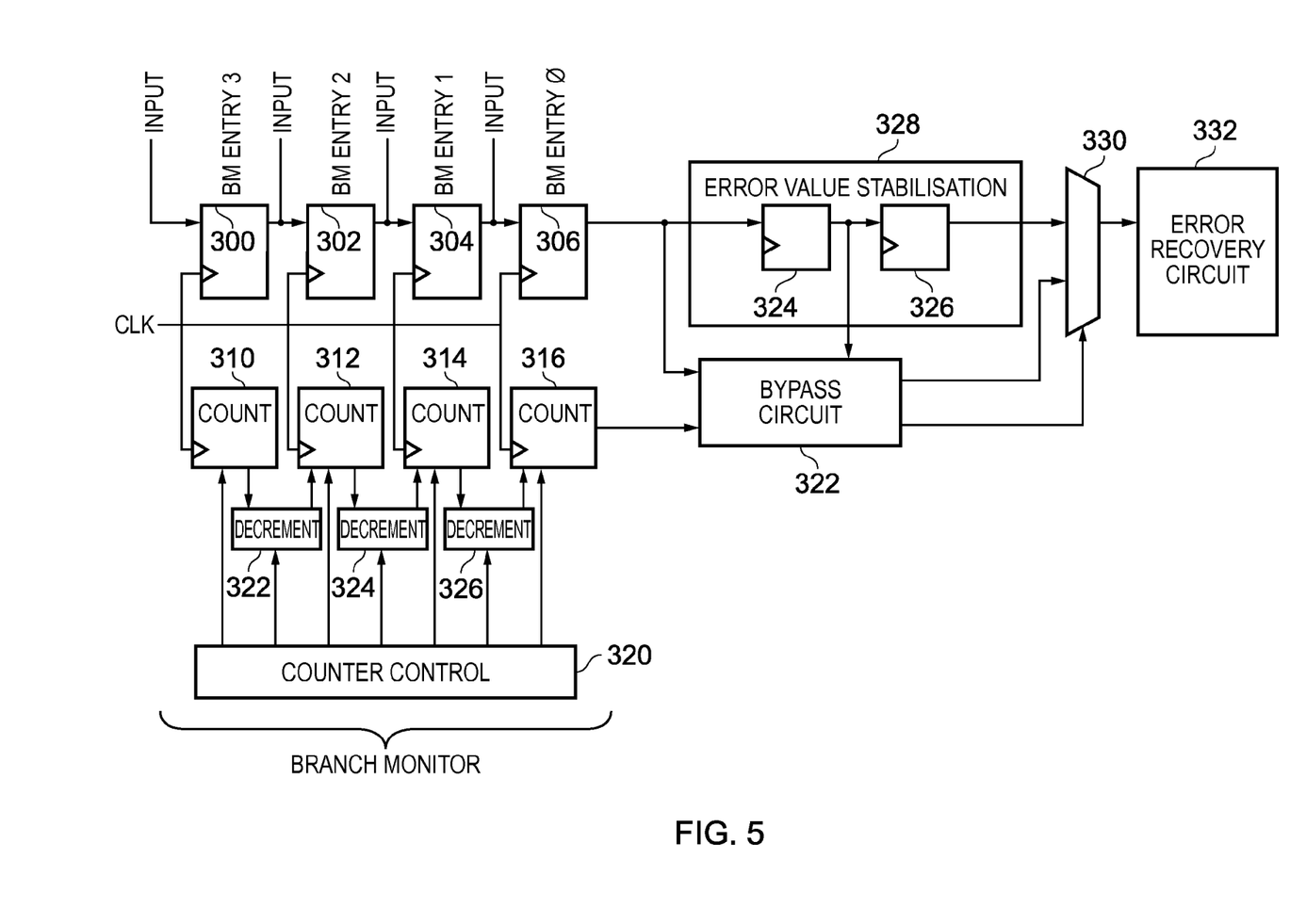
FIG. 5 schematically illustrates the configuration of a branch monitor, error value stabilisation circuitry, bypass circuitry, arbitration circuitry and error recovery circuitry in one embodiment.

FIG. 5 schematically illustrates in more detail the configuration of a branch monitor unit in one embodiment. Fundamentally, the branch monitor comprises four entries 300, 302, 304, 306 arranged in a sequential fashion. Accordingly input into entry 300 will pass through entry 302, entry 304 and entry 306 before exiting the branch monitor. It should be noted that for the purposes of the present discussion the entries 300, 302, 304, 306 correspond only to the error status portion of each entry illustrated in FIG. 3 and further aspects of each entry (such as the branch instruction ID and the target PC) are not illustrated here. Associated with each error entry is a count flop 310, 312, 314, 316 respectively configured to hold the above mentioned count value in association with an error value being propagated through the entries of the branch monitor. The count flops are operated under control of counter control 320 which further controls decrement units 322, 324, 326 which are configured to receive a value from the proceeding count flop and to decrement the value before passing it to the following count flop. Accordingly, a count value will decrement as it moves between the branch monitor entries. It should be noted that the counter control and decrement units are configured such that the count values bottom out at zero.

Note that an input to each of the branch monitor entries 300, 302, 304, 306 may be provided by the preceding stage (where such stage exists) or may be provided as a direct input if the corresponding branch instruction has already reached the corresponding branch monitor entry stage by the time the error value is written. For example, taking the example schematically illustrated in FIG. 4, wherein branch instruction BR2 is currently in the third oldest entry of the branch monitor, this can be seen to correspond to branch monitor entry 2 (error flop 302 and count flop 312) in FIG. 5. Hence, when the target PC generation circuitry writes the resolved target PC value into the corresponding entry in the branch monitor (not explicitly shown in FIG. 5) the error is written into flop 302 and the counter control 320 causes a count value of 2 to be written into count flop 312. Thereafter, as older entries in the branch monitor are popped, the error value held in flop 302 is propagated through flops 304 and 306 before itself exiting the branch monitor. In parallel, the count value of 2 held in count flop 312 is decremented to 1 to be held in count flop 314 and decremented to 0 to be held in count flop 316.

When an entry is popped from the branch monitor, the count value held at count flop 316 is passed to bypass circuit 322. In dependence on the value of the count value, the bypass circuit 322 can intervene to cause one or both of the re-sampling steps provided by flops 324, 326 in error value stabilisation circuitry 328 to be omitted. Specifically, if the count value is 0 then bypass circuit 322 causes the error value received from flop 306 to initially bypass the error value stabilisation circuit 328, whilst if the count value is 1 the bypass circuit 322 causes the error value to only pass through flop 324 then bypassing flop 326. The arbitration circuitry 330 (here in the form of a multiplexer) is provided such that the bypass circuit 322 can pass the error value onto the error recovery circuit 332. Further, the arbitration circuitry 330 can selectively (under the control of bypass circuitry 322) prioritise between error values propagating through the error value stabilisation circuit 328 and error values propagating via the bypass circuit 322. In one embodiment the arbitration circuit 330 is configured to allow an error value passing through the error value stabilisation circuit 328 to be passed to error recovery circuit 332, holding up an error value being passed through bypass circuit 332. This is because the error value in error stabilisation circuit 328 will typically correspond to an older entry in the branch monitor and it may therefore be preferential to allow the error recovery circuit 332 to begin acting on this error sooner. Alternatively the error value passing through the bypass circuit 322 may take priority.

Figure 6A:
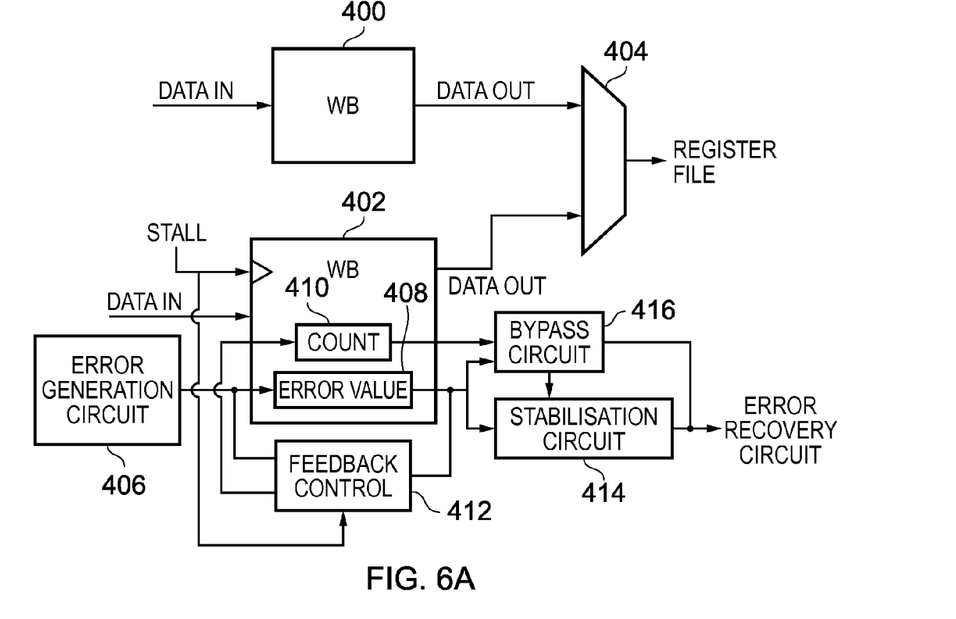
FIG. 6A schematically illustrates a write-back stage of an execution pipeline in one embodiment.

FIG. 6A schematically illustrates another example embodiment in which the techniques of the present invention are applied in a write-back stage of the execution pipeline. In this example two write-back stages 400 and 402 compete for access to a given register file and multiplexer 404 selects between the data output from each of these write-back stages. Accordingly, one of write-back stages 400 and 402 may be stalled whilst the other is writing to the register file. In the illustrated example in FIG. 6A the write-back stage 402 is stalled (by the assertion of the STALL signal).

FIG. 6A schematically illustrates that as well as the data which is handled by the write-back stage 402, an error value is also received from error generation circuit 406 which is held in a temporary storage unit 408 within write-back stage 402. When this error value is first written into storage 408 a count value is also stored in temporary storage 410. Feedback control 412 is provided to administer the feeding back of error value 408 upon itself whilst write-back stage 402 is stalled. Accordingly, at each cycle where the stall signal is still asserted, the feedback control 412 causes the error value 408 to be fed back and hence re-sampled. Each time this happens the feedback control 412 decrements count value 410. In this way, when write-back stage 402 is released from the stall condition, the count value 410 is received by bypass circuit 416 which can determine if this count value has reached zero, i.e. if the re-sampling of the error value whilst it was stalled in write-back stage 402 has happened sufficient times for the stabilisation procedure in stabilisation circuit 414 to be unnecessary. In this case bypass circuitry 416 can cause stabilisation circuitry 414 to be bypassed by the error value received from write-back stage 402. Further, similarly to as described in FIG. 5, bypass circuit 416 may cause the count value to bypass only one stage of the stabilisation circuit 414 (if the count value is one).

Figure 6B:
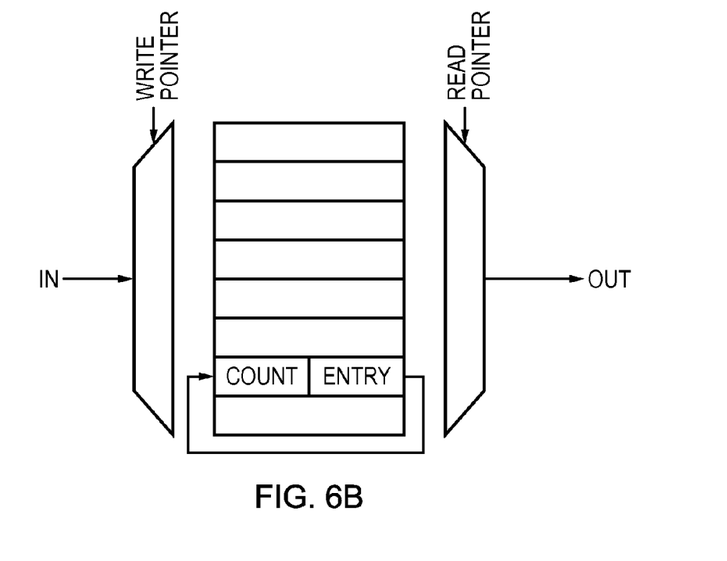
FIG. 6B schematically illustrates a buffering device in one embodiment.

FIG. 6B schematically illustrates an alternative storage structure in which an error value could be held by the data processing apparatus and in which the time that the error value spends within an entry of this device can be used to resample the error value and thus avoid the error value stabilisation circuit which follows. In the example of FIG. 6B a multiple entry storage device is provided in which entries may be written to and read from by means of write and read pointers to select particular entries. Entries of this storage device are provided with feedback circuitry such that, as described with reference to FIG. 6A, whilst an entry is held within the storage device it may be re-sampled.

Figure 7:
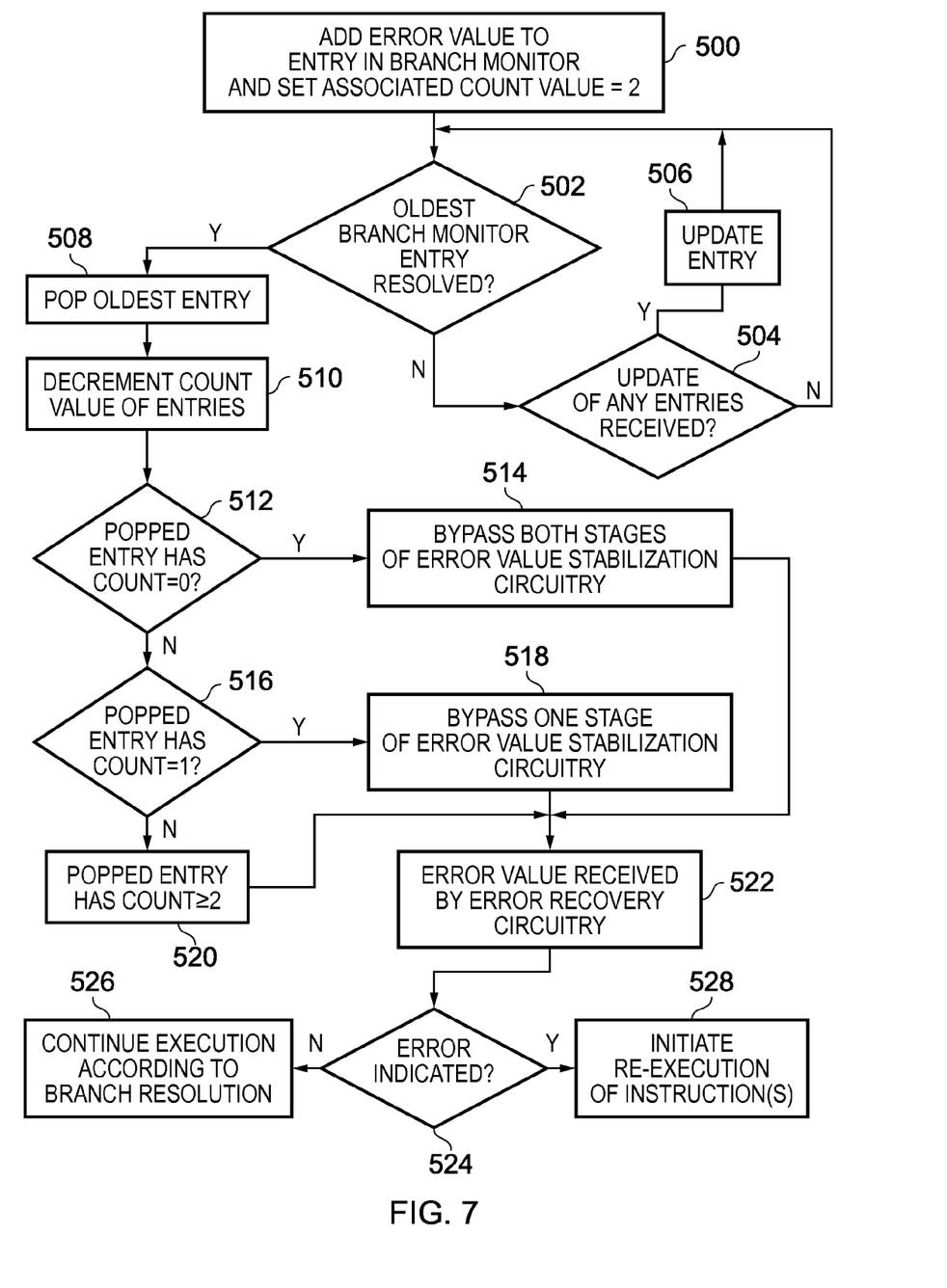
FIG. 7 illustrates a sequence of steps which may be taken in a data processing apparatus in one embodiment.

FIG. 7 schematically illustrates a series of steps which may be taken in a data processing apparatus in one embodiment. In particular, the series of steps illustrated correspond to a branch monitor example as discussed above. The flow begins at step 500 at which an error value is added to a given entry in the branch monitor and the associated count value is set to 2. Thereafter at step 502 it is determined if the oldest branch monitor entry has been resolved. If it has not then at step 504 it is determined if any further entries can be updated and if they can this is done so at step 506. The flow loops through step 502 until the oldest branch monitor entry is resolved. Then, the flow proceeds to step 508 where the oldest entry in the branch monitor is popped and the remaining entries shuffle one position through the branch monitor and their respective count values are decremented (step 510). Considering the popped entry, at step 512 it is determined by the bypass circuit if this entry has a count value of 0. If it has then at step 514 both stages of the error value stabilisation circuitry are bypassed. Alternatively if it is determined at step 516 that the popped entry has a count value of 1 then at step 518 only one stage of the error value stabilisation circuitry is bypassed. In the final alternative at step 520 it is therefore determined that the popped entry has a count value of at least 2 and both stages of the error value stabilisation circuitry will be used. Subsequently the error value which either passed through one or more stages of the stabilisation circuitry or bypassed it is received by the error recovery circuitry at step 522. This error value is examined and if it is determined at step 524 that an error is not indicated then at step 526 instruction execution may continue according to the branch resolution for this instruction. If however it is determined that at step 524 that an error has been indicated then the flow proceeds to step 528 where the re-execution of one or more instructions is initiated.

In brief overall summary, a data processing apparatus has error detection units each configured to generate an error signal if a first and second sample of a signal associated with execution of an instruction differ. Error value generation circuitry generates an error value showing if any of the error detection units have generated the error signal. Error value stabilisation circuitry performs a stabilisation procedure comprising re-sampling the error value to remove metastability. Error recovery circuitry initiates re-execution of the instruction if the error value is asserted. Count circuitry holds a counter value in association with the error value, the counter value set to a predetermined value when the error value is generated and decremented each time the error value is re-sampled prior to reaching the error value stabilisation circuitry. The error value bypasses the stabilisation procedure if the counter value is zero before the error value reaches the error value stabilisation circuitry.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus configured to perform data processing operations in response to a sequence of instructions, said data processing apparatus comprising:
 a plurality of error detection units, each error detection unit configured to generate a first sample of a signal associated with execution of an instruction, configured to generate a second sample of said signal after a delay period, and configured to generate an error signal if said first sample and said second sample differ;
 error value generation circuitry configured to generate an error value indicative of whether any of said plurality of error detection units have generated said error signal;
 error value stabilisation circuitry configured to receive said error value and to perform a stabilisation procedure on said error value, said stabilisation procedure comprising re-sampling said error value to remove metastability from said error value resulting from metastability of said error signal generated by at least one of said error detection units;
 error recovery circuitry configured to receive said error value from said error value stabilisation circuitry and to initiate re-execution of said instruction if said error value indicates that said error signal was generated by at least one of said error detection units;
 count circuitry configured to hold a counter value in association with said error value, said counter value being set to a predetermined value when said error value is generated, and said count circuitry configured to decrement said counter value each time said error value is re-sampled prior to reaching said error value stabilisation circuitry; and
 bypass circuitry configured to pass said error value to said error recovery circuitry directly without being subjected to said stabilisation procedure if said counter value is zero before said error value reaches said error value stabilisation circuitry.

2. A data processing apparatus as claimed in claim 1, wherein said error value generation circuitry is configured to write said error value into a selected entry of a sequential buffering device having multiple entries, wherein an output of a last entry of said multiple entries of said sequential buffering device provides said error value to an input of said error value stabilisation circuitry,     wherein said sequential buffering device is configured to enact sequential movement of content between its multiple entries, wherein said movement of content comprises re-sampling said content,     and wherein said count circuitry is configured to propagate said counter value through said sequential buffering device in association with said error value.

3. A data processing apparatus as claimed in claim 2, wherein said count circuitry is configured to hold said counter value in association with said error value only for a last two entries of said multiple entries.

4. A data processing apparatus as claimed in claim 2, wherein said sequential buffering device is a FIFO device.

5. A data processing apparatus as claimed in claim 2, wherein said sequential buffering device is a branch monitor device, and said branch monitor device is configured to hold branch prediction information associated with branch instructions in said sequence of instructions.

6. A data processing apparatus as claimed in claim 5, wherein said branch monitor device is configured to enact said sequential movement of said content between its multiple entries when an oldest entry in said branch monitor device relates to a resolved branch instruction.

7. A data processing apparatus as claimed in claim 1, wherein said data processing apparatus is configured to be able to stall progress of said error value at a predetermined location between said error value generation circuitry and said error value stabilisation circuitry, and wherein said data processing apparatus further comprises feedback circuitry configured to feed said error value back upon itself at said predetermined location such that said error value is re-sampled.

8. A data processing apparatus as claimed in claim 1, wherein said data processing apparatus is configured to hold said error value at a predetermined location between said error value generation circuitry and said error value stabilisation circuitry, and wherein said data processing apparatus further comprises feedback circuitry configured to feed said error value back upon itself at said predetermined location such that said error value is re-sampled.

9. A data processing apparatus as claimed in claim 1, wherein said error value generation circuitry is arranged in a write-back stage of an execution pipeline of said data processing apparatus.

10. A data processing apparatus as claimed in claim 1, wherein said stabilisation procedure comprises twice re-sampling said error value and wherein said predetermined value is two.

11. A data processing apparatus as claimed in claim 10, wherein said bypass circuitry is configured, if said counter value is one when said error value reaches said error value stabilisation circuitry, to cause said error value stabilisation circuitry to perform a reduced stabilisation procedure on said error value, said reduced stabilisation procedure comprising once re-sampling said error value.

12. A data processing apparatus as claimed in claim 1, wherein said bypass circuitry further comprises arbitration circuitry configured to arbitrate between an earlier error value which is currently being handled by said error value stabilisation circuitry and said error value to be passed to said error recovery circuitry directly.

13. A data processing apparatus as claimed in claim 12, wherein said arbitration circuitry is configured to prioritise said error value.

14. A data processing apparatus as claimed in claim 12, wherein said arbitration circuitry is configured to prioritise said earlier error value.

15. A data processing apparatus configured to perform data processing operations in response to a sequence of instructions, said data processing apparatus comprising:

a plurality of error detection means, each error detection means for generating a first sample of a signal associated with execution of an instruction, for generating a second sample of said signal after a delay period, and for generating an error signal if said first sample and said second sample differ;

error value generation means for generating an error value indicative of whether any of said plurality of error detection means have generated said error signal;

error value stabilisation means for receiving said error value and for performing a stabilisation procedure on said error value, said stabilisation procedure comprising re-sampling said error value to remove metastability from said error value resulting from metastability of said error signal generated by at least one of said error detection means;

error recovery means for receiving said error value from said error value stabilisation means and for initiating re-execution of said instruction if said error value indicates that said error signal was generated by at least one of said error detection means;

counting means for holding a counter value in association with said error value, said counter value being set to a predetermined value when said error value is generated, and said counting means for decrementing said counter value each time said error value is re-sampled prior to reaching said error value stabilisation means; and     bypass means for passing said error value to said error recovery means directly without being subjected to said stabilisation procedure if said counter value is zero before said error value reaches said error value stabilisation means.

16. A method of operating a data processing apparatus configured to perform data processing operations in response to a sequence of instructions, said method comprising the steps of:

in each of a plurality of error detection units generating a first sample of a signal associated with execution of an instruction, generating a second sample of said signal after a delay period, and generating an error signal if said first sample and said second sample differ;

generating an error value indicative of whether any of said plurality of error detection units have generated said error signal;

receiving said error value in error value stabilisation circuitry and to performing a stabilisation procedure on said error value, said stabilisation procedure comprising re-sampling said error value to remove metastability from said error value resulting from metastability of said error signal generated by at least one of said error detection units;

receiving said error value from said error value stabilisation circuitry in error recovery circuitry and initiating re-execution of said instruction if said error value indicates that said error signal was generated by at least one of said error detection units;

holding a counter value in association with said error value, said counter value being set to a predetermined value when said error value is generated, and decrementing said counter value each time said error value is re-sampled prior to reaching said error value stabilisation circuitry; and passing said error value to said error recovery circuitry directly without being subjected to said stabilisation procedure if said counter value is zero before said error value reaches said error value stabilisation circuitry.

* * * * *